United States Patent [19]
Lo et al.

[11] Patent Number: 5,909,190
[45] Date of Patent: Jun. 1, 1999

[54] CLUTTER REJECTION USING ADAPTIVE ESTIMATION OF CLUTTER PROBABILITY DENSITY FUNCTION

[75] Inventors: Thomas K. Lo; W. Scott Johnston, both of Tucson, Ariz.

[73] Assignee: Raytheon Company, Lexington, Mass.

[21] Appl. No.: 08/961,377

[22] Filed: Oct. 30, 1997

[51] Int. Cl.⁶ .................................................. G01S 7/539
[52] U.S. Cl. ................................................................ 342/159
[58] Field of Search ........................... 342/40, 159, 160, 342/162, 195; 382/103

[56] References Cited

U.S. PATENT DOCUMENTS 5,612,928  3/1997  Haley et al. .......................... 382/103
5,798,728  8/1998  Tomishima et al. .................... 342/159

*Primary Examiner*—Ian J. Lobo
*Attorney, Agent, or Firm*—David W. Collins; Andrew J. Rudd; Glenn H. Lenzen, Jr.

[57] ABSTRACT

A processor and method for discriminating against interference during target acquisition and reacquisition processing of densely cluttered images. The processor and method that adaptively estimates the feature probability density function of the interference from the image data. The estimated interference probability density function, along with target feature estimates are input to a Bayesian classifier that discriminates the interference from the target.

10 Claims, 4 Drawing Sheets

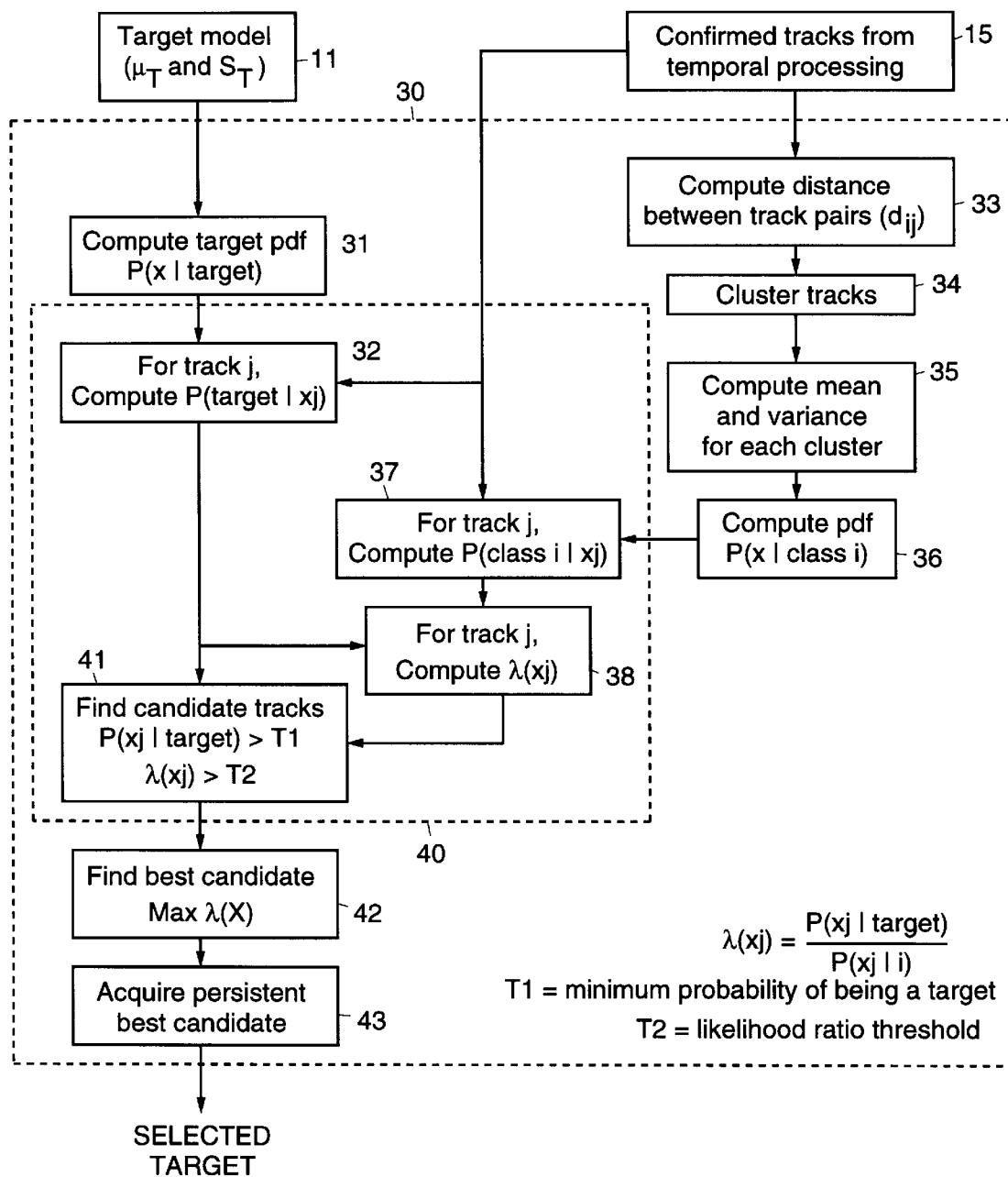

CLUTTER REJECTION USING ADAPTIVE ESTIMATION OF CLUTTER PROBABILITY DENSITY FUNCTION

BACKGROUND

The present invention relates generally to clutter rejection processors and processing methods and sensors, and more particularly, to a clutter rejection processor and processing method implemented using adaptive estimation of a clutter probability density function.

One prior art processing method uses a nearest distance classifier. The nearest distance classifier computes a normalized distance between the estimated target state and each stable track and forms a set of distances {di}. It then compares the set of distances to a preset threshold set on the basis of the covariance of the target state. If one or more tracks have a distance smaller than the threshold, the track with the smallest distance is presumed to be the target and is (re)acquired. The choice of the threshold is usually based on minimizing the probability of false match given the correct target track is being considered.

The disadvantage of the prior art nearest distance classifier is a potential high probability of false acquisition, particularly in situations where the covariance of the target state is large (due to poor knowledge of the target state) and the correct target is not detected. In this situation, many potential clutter and/or countermeasure tracks may have sufficiently small distance relative to the threshold to be falsely (re)acquired. The false (re)acquisition problem is particularly troublesome when a target track is not detected because the target track generally tends to be the smallest distance track to the estimated target state. Therefore, the presence of the target track tends to reduce false (re)acquisition.

Therefore, it would be an advantage to have a clutter rejection processor and processing method that does not have a high probability of false acquisition. Accordingly, it is an objective of the present invention to provide for a clutter rejection processor and processing method implemented using adaptive estimation of a clutter probability density function.

SUMMARY OF THE INVENTION

To meet the above and other objectives, the present invention provides for a processor and method for discriminating against interference (background clutter, countermeasures, fixed pattern noise, random noise, and the like) during target acquisition and reacquisition processing of densely cluttered images (including infrared and visible images). The present invention provides a processor and method that adaptively estimates the feature probability density function (pdf) of the interference from the image data in real time. The estimated interference probability density function, along with target feature estimates derived from a fire control system during acquisition or from prior target tracking during reacquisition, form inputs to a Bayesian classifier in accordance with the present invention that discriminates the interference from the target.

The key aspect of the present processor and method is the adaptive estimation of the interference probability density function from image data. The underlying assumptions used in the present invention are that (1) the acquisition scenario is target-sparse, i.e., the vast majority of stable tracks in the image are interference tracks, and (2) each class of interference exhibits common behavior, i.e., feature vectors for all members of each class of interference (e.g., flares) cluster.

In a dense clutter environment, many objects are detected and form stable tracks. Consistent with assumption 1, the vast majority of these tracks originate from clutter. The present invention finds the mean and variance of each feature from the collection of the stable tracks. The variances cluster about the mean of the class (assumption 2). The sampled means and variances are used to estimate the probability density function of the interference. In the present invention, all features are assumed to be independent and the form of the probability density function for each feature is assumed to be either Gaussian or uniform.

The corresponding estimates of target features, either from prior assumptions or obtained externally from the fire control system are used to estimate the probability density function of the target. Given the target and interference probability density functions, a Bayesian classifier is used to classify each stable track as to its a posteriori probability of being in the target or interference (clutter) class. Because the interference probability density function is derived from measurements of stable interference tracks, the interference self-discriminates.

The present method was implemented in a signal processor and tested. The present method and processor was able to autonomously acquire an aircraft target in the presence of terrain clutter in real time using infrared video data collected with an missile sensor.

The present invention autonomously acquires or reacquires a target in the presence of severe interference (clutter or countermeasures) with an acceptably low false alarm rate. Because potential false alarms (stable clutter tracks) are used to estimate the probability density function of the interference, they self-discriminate and therefore cause a reduction of the probability of false acquisition on these false tracks. The present invention is particularly advantageous when the covariance (a measure of uncertainty) associated with the target feature measurement is large (i.e., has a large uncertainty).

The present invention may be used in systems having autonomous acquisition or fire-and forget-trackers, for example. The present invention may be used to initially acquire a target and reacquire the target subsequent to tracker breaklock.

The prior art nearest distance classifier discussed in the Background section is a trivial subset of the present invention, and corresponds to a specialized case where the interference probability density function is assumed to be uniform (a condition corresponding to total ignorance of the interference). This special condition is an initial condition used by the present invention until interference characteristics are formed by measuring the interference properties of the tracks. Once the interference probability density functions are estimated using the collective properties of the tracks, discrimination against individually tracks with features consistent with the collective properties is performed with the Bayesian classifier. This reduces the false (re) acquisition problem that occurs using the prior art nearest distance classifier.

BRIEF DESCRIPTION OF THE DRAWINGS

The various features and advantages of the present invention may be more readily understood with reference to the following detailed description taken in conjunction with the accompanying drawings, wherein like reference numerals represent like structural elements, and in which

FIG. 2 illustrates steps involved in acquiring or reacquiring a target using the present invention;

DETAILED DESCRIPTION

Figure 1:
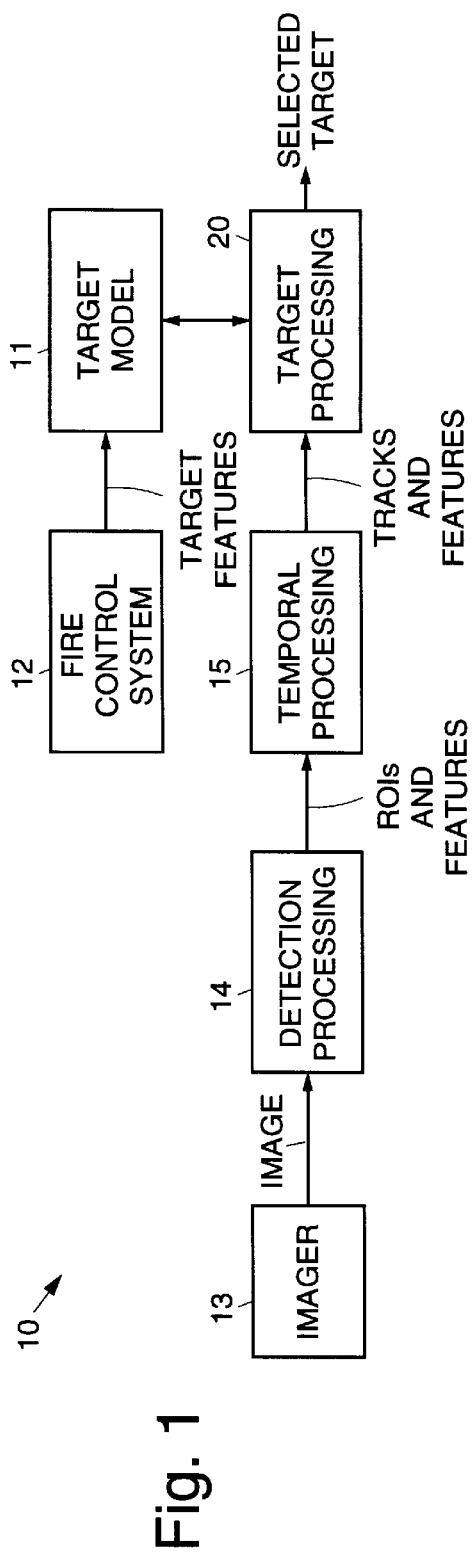
FIG. 1 illustrates a basic signal processing architecture for trackers in accordance with the principles of the present invention.

Referring to the drawing figures, FIG. 1 illustrates a multiple target tracker signal processing architecture of a signal processor 10 implemented in accordance with the principles of the present invention. The architecture of the signal processor 10 has a target model 11 that receives target feature estimates that are input from a fire control system 12 or the signal processor 10, for example. An input image, such as a visible or infrared image, for example, derived from an imager 13, such as an electro-optical, infrared, or video imager, for example, is input into a detection processor 14. Regions of interest (ROIs) and features contained in the image are output from the detection processor 14 and are input to a temporal processor 15. The temporal processor 15 outputs tracks and the features of each track. The target processor 20 is coupled to both the target model 11 and the temporal processor 15 and processes data input thereto and outputs a selected target or targets contained in the image.

FIG. 2 illustrates steps in a processing method 30 used in the target processor 20 to acquire a target. The target processor 20 and processing method 30 provide a means and method for automatically acquiring or reacquiring an isolated target (T) in the presence of clutter (C) and/or countermeasures (C) while minimizing the probability of falsely acquiring or reacquiring the clutter and/or countermeasures. The problem of false acquisition is most acute under conditions where there is large uncertainty in knowledge of the target state and/or when the target is not detected. Given knowledge of feature probability density functions (pdf) of target and interference classes, the target is acquired with minimum error through the use of Bayes Rule.

However, the probability density functions of the target and the interference are seldom known. The present invention provides a means of estimating these probability density functions and enables the use of Bayes Rule for target acquisition. The basic premises of the present invention are that (1) the target is separable from the competing clutter and/or countermeasures in feature space, (2) the acquisition scenario is a target sparse scenario (few targets in the field of view of the imager 13), (3) the expected value of the target feature vector and the associated covariance matrix are available either from the fire control system 12 in the case of initial acquisition or from prior tracking of the target in the case of reacquisition, and (4) intervening objects (clutter and/or countermeasures) of a given class all have some common features.

The premises stated above are typical of air-to-air missile engagements, for example. In order for a target to be distinguishable (and hence, acquirable) from the intervening objects, it must differ in some measurable property from them. In air-to-air engagements, there are seldom more than one or two targets in the field of view of the imager 12. An expected target, feature vector forms the target model 11 and is generally required in any acquisition problem. The assumption that objects of a given class have some common features arises from physical grounds. For example, terrestrial clutter has a common line-of-sight rate because they are rigidly fixed on the earth. Similarly, flares and flare fragments have a common velocity due to drag.

The present invention assumes that the signal processor 10 has a multiple target tracker architecture shown in FIG. 1. Such a multiple target tracker is generally known to those skilled in the art. The detection processor 13 employs filtering and thresholding processes to isolate target-like regions of interest (ROIs) in the image. Each region of interest is called an object (or a detection). Features are measured for each object in the detection processor 14. Typical features include position in the image, amplitude, and size (area and radii of gyration). The detected objects of a single frame are associated with corresponding detections from prior frames to form tracks. The detected object features are filtered by the temporal processor 15 to form track features. Filtering is typically performed using Kalman filters that provide both an estimate of the track feature vector and the covariance matrix. The track features include the detection features and typically their first order time derivatives. Tracks that have a sufficient number of associations over multiple frames so that the track features converge are known as confirmed tracks. The target processor 20 and method 30 of the present invention attempts to classify the confirmed tracks and to determine which, if any, of the confirmed tracks is to be (re)acquired as the target.

With reference to FIG. 2, the target processor 20 and processing method 30 acquire the target track and reject clutter and countermeasure tracks as follows. The probability density function of the target 31 is formed from the target model 11 using the target feature vector mean, $\mu_T$, and covariance $S_T$. The feature probability density function of the target is given by $$p(x|\text{target}) = |2\pi S_T|^{0.5} \exp\{-0.5(x-\mu_T)^T S_T^{-1}(x-\mu_T)\}.$$

To form the corresponding feature probability density function for each clutter class, a collection of confirmed tracks form the temporal processor 15 is examined and a normalized squared distance ($d_{ij}$) between all track pairs is computed 33. The normalized squared distance between tracks i and j that is computed 33 is given by $$d_{ij} = (x_i - x_j)^T \{S_i + S_j\}(x_i - x_j),$$

where $x_i$ and $S_i$ are the feature vector and covariance matrix of track i and $x_j$ and $S_j$ are the feature vector and covariance matrix of track j.

The track that is farthest away from all other tracks is identified as an outlier track. Track $i_0$ is an outlier track if $\Sigma_j d_{i_0 j}$ is greater than the corresponding sum for all i not equal to $i_0$. The remaining tracks are grouped 34 into clusters on the basis of the normalized squared distance using well known clustering techniques, such as hierarchical agglomeration, for example.

Each cluster having three or more members is considered a nontarget class. The sampled mean and variance of the feature vectors of the members are used to estimate 35 the expected feature vector and covariance of the class. The expected feature vector for the mth class is $\mu_m = \Sigma_j x_{mj}/N_m$, where the sum extends over all members j that belongs to the mth class and $N_m$ is the number of members in class m. The covariance matrix of class m, $S_m$, is assumed to be diagonal (i.e., no correlation among feature components) and the variance of each feature component is given by the sample variance of the tracks that belong to the mth class. The feature probability density function for the mth nontarget class is computed 36 by the equation $$p(x|m) = |2\pi S_m|^{-0.5} \exp\{-0.5(x-\mu_m) S_m(x-\mu m)\}.$$

Each confirmed track, say track j, from the temporal processor 15 is evaluated for its membership in the target class and each of the clutter classes. The feature vector of the jth confirmed track, $x_j$, is extracted from the temporal processor 15. The unnormalized probability that the jth track belongs to the target class, $p(target|x_j)$ is computed 32 by the expression $p(target|x_j)=p(target)p(x=x_j|target)$ where $p(target)$ is the apriori probability that an object belongs to the class target and $p(x=x_j|target)$ is the evaluation of the expression $p(x|target)$ with $x=x_j$. The procedure for the computation of $p(target|x_j)$ follows from the well known Bayes rule. In similar manner, the probability that the jth track belongs to clutter class m, $p(m|x_j)$ is computed 37 using the expression $p(m|x_j)=p(m)p(x=x_j|m)$ where $p(m)$ is the prior probability that an object belongs to class m. The above calculation is performed for each confirmed track, j, and over all clutter classes m.

For each track, j, the likelihood ratio that it is a target is computed 38 using the expression $\lambda(x_j)=p(target|x_j)/\Sigma_m p(m|x_j)$. In the special case where there is only one clutter class, i.e., m=1 only, and the prior probabilities $p(target)=p(m)$, the likelihood ratio reduces to the well known expression $\lambda(x_j)=p(x_j|target)/p(x_j|m)$. Track j is considered a candidate target 41 if $p(x_j|target)>$ threshold T1 and $\lambda(x_j)>$ threshold T2. Processing blocks 32, 37, 38 and 41 in FIG. 2 are elements of a Bayesian classifier 40.

The condition $p(x_j|target)>$ threshold T1 corresponds to the prior art condition that the candidate track is close to the expected target feature vector. The condition $\lambda(x_j)>$ threshold T2 corresponds to the additional requirement that the track is both target-like and not clutter-like. In cases where multiple tracks satisfy the threshold conditions for a given image, the track, j, with the highest likelihood ratio, $\lambda(x_j)$, is found 42 and is considered the best target track of that image. A track that is persistently the best track over several consecutive images is (re)acquired 43 as the target.

Figure 3:
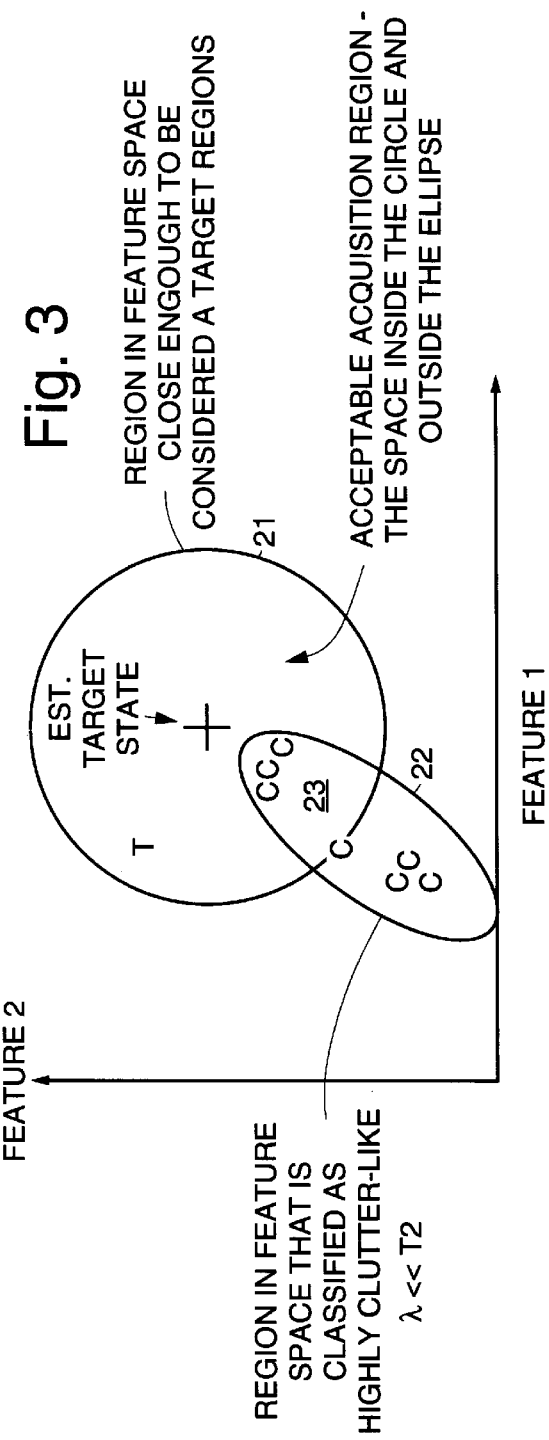
FIG. 3 illustrates use of the present invention to reject clutter tracks.

The concept of the invention is illustrated in FIG. 3 and which illustrates use of the present invention to reject clutter tracks. The target model 11 defines a target region 21 in feature space that is considered to be sufficiently "target-like", and which is indicated by the circle 21 shown in FIG. 3. Any track that is acquirable has feature vectors that reside within the target region 21. The feature vector of clutter is estimated 35 from the collective properties of the confirmed track clusters determined in step 34. Thus, a collection of clutter tracks (C) define a dense clutter region 22 in feature space and that belong to clutter and are indicated by the oval 22 shown in FIG. 3. The clutter region 22 has low likelihood ratio and acquisition is inhibited. Four clutter tracks (C) have been excluded in the example shown in FIG. 3. A target acquisition region 23 is defined by the area enclosed by the target region 21 (or circle 21) excluding the area within the target region 21 bounded by the clutter region 22.

The present invention provides a solution for the several classes of target tracking problems, including initial target acquisition, target reacquisition following a breaklock after target tracking has commenced, and target reacquisition following breaklock induced by a flare countermeasure released by the target.

Quantitative results were obtained using synthetic data to verify the performance of the present processor 20 and method 30. These data are shown in FIGS. 4a–4e. In these examples, a two class (target and interference) problem was evaluated.

These sample runs shown in FIGS. 4a–4e contain only one target and multiple interference tracks to approximate a typical air-to-air acquisition problem. The nominal target has feature vector (0.,0.) and the feature vector of the target detection is generated randomly as a Gaussian random variable with mean and standard deviation specified by the target model. The acquisition criteria are that a normalized square distance of 9.2 or less relative to the expected target state to allow a probability of target acquisition of 0.99 in a no interference case (this is a target gate), and a likelihood ratio greater than 30 based on the prior probability of the target and the relative cost of false acquisition to missed acquisition. Those tracks that satisfy the distance and likelihood ratio criteria individually are underlined. Those tracks that satisfy both criteria are acquired.

Figure 4A:
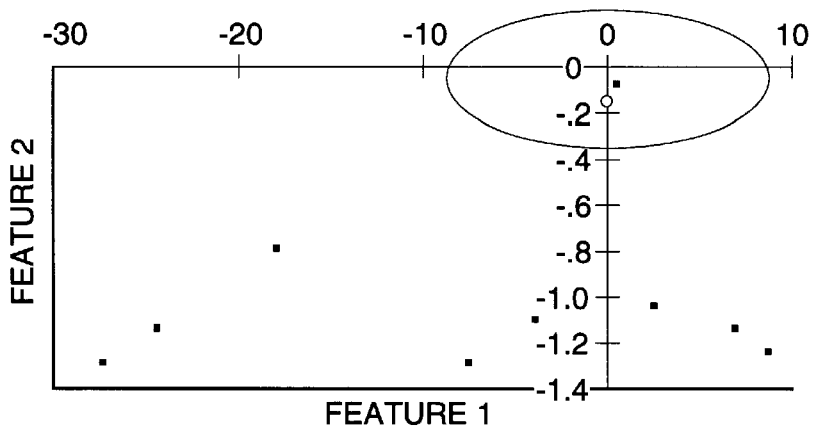
FIGS. 4a–4e show quantitative results that was obtained using synthetic data to verify the performance of the present processor and method.

FIG. 4a shows the case where the covariance of the target model is small and there is large separation between the target and the clutter. This is the case of target reacquisition following a brief breaklock. In this case, only the target track is inside the target gate. The target is easily reacquired in this case. The data associated with the graph shown in FIG. 4a is given in Table 1.

TABLE 1

(Data for FIG. 4a)

| True Class | Feature 1 | Feature 2 | Distance from Target | Likelihood ratio | Acquired |
|---|---|---|---|---|---|
| Target | 0.62 | −0.07 | 0.55 | 2.20E + 04 | No |
| Clutter | 2.81 | −1.04 | 109.12 | 1.00E − 07 | No |
| Clutter | −23.95 | −1.08 | 208.58 | 1.00E − 07 | No |
| Clutter | −27.04 | −1.29 | 282.57 | 1.00E − 07 | No |
| Clutter | 6.52 | −1.13 | 133.61 | 1.00E − 07 | No |
| Clutter | 8.71 | −1.18 | 151.37 | 1.00E − 07 | No |
| Clutter | −3.53 | −1.04 | 109.12 | 1.00E − 07 | No |
| Clutter | −17.47 | −0.73 | 102.48 | 1.00E − 07 | No |
| Clutter | −6.77 | −1.27 | 168.42 | 1.00E − 07 | No |

Figure 4B:
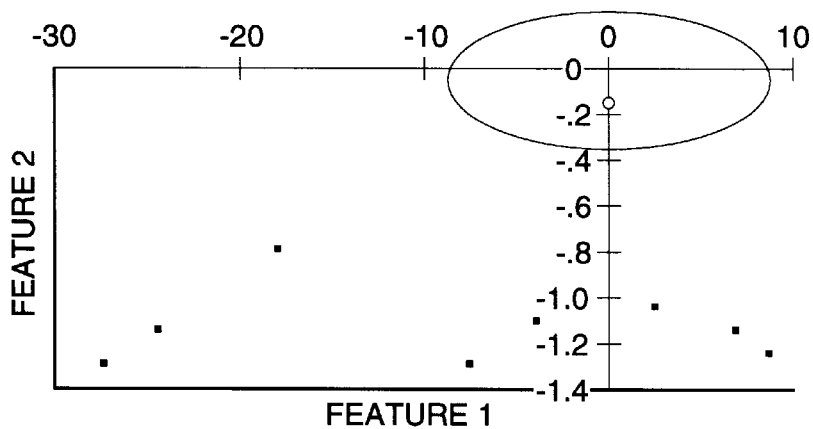

FIG. 4b shows the same case as 4a except that the target is not detected (i.e., the target track does not exist). In this case, no track is reacquired.

TABLE 2

(Data for FIG. 4b)

| True Class | Feature 1 | Feature 2 | Distance from Target | Likelihood ratio | Acquired |
|---|---|---|---|---|---|
| Clutter | 2.81 | −1.04 | 109.12 | 1.00E − 07 | No |
| Clutter | −23.95 | −1.08 | 208.58 | 1.00E − 07 | No |
| Clutter | −27.04 | −1.29 | 282.57 | 1.00E − 07 | No |
| Clutter | 6.52 | −1.13 | 133.61 | 1.00E − 07 | No |
| Clutter | 8.71 | −1.18 | 151.37 | 1.00E − 07 | No |
| Clutter | −3.53 | −1.04 | 109.12 | 1.00E − 07 | No |
| Clutter | −17.47 | −0.73 | 102.48 | 1.00E − 07 | No |
| Clutter | −6.77 | −1.27 | 168.42 | 1.00E − 07 | No |

Figure 4C:
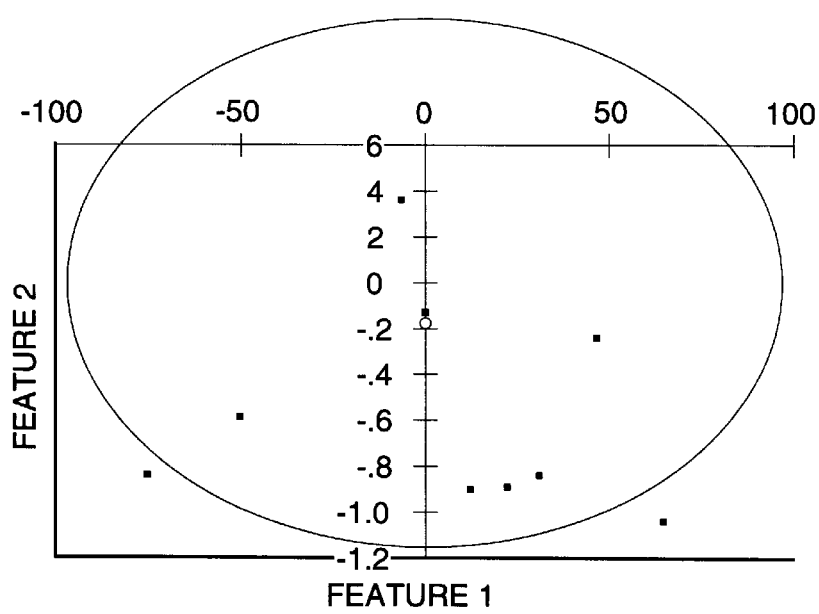

FIG. 4c shows the case where the covariance of the target model is large. This may occur as a result of poor cueing in initial acquisition or the growth of covariance during a prolonged breaklock. In this case, there are multiple tracks inside the target gate. The separation in feature vector between the target and the clutter prohibits reacquisition of any track. In the prior art method, where only the distance relative to the target model is used, the closest track to the target model within the target gate would be acquired. In this particular example, a clutter track would have been acquired.

TABLE 3

(Data for FIG. 4c)

| True Class | Feature 1 | Feature 2 | Distance from Target | Likelihood ratio | Acquired |
|---|---|---|---|---|---|
| Target | −12.65 | 4.01 | 0.97 | 6.60E + 00 | No |
| Clutter | 25.73 | −9.34 | 4.95 | 1.40E + 00 | No |
| Clutter | 31.25 | −1.98 | 1.28 | 9.60E − 01 | No |
| Clutter | 16.91 | −9.39 | 4.67 | 1.80E + 00 | No |
| Clutter | −71.63 | −7.99 | 8.8 | 1.00E − 07 | No |
| Clutter | −50.44 | −6.01 | 4.61 | 1.00E − 07 | No |
| Clutter | 66.99 | −11.01 | 10.97 | 1.00E − 07 | No |
| Clutter | −0.02 | −1.28 | 0.08 | 1.80E + 00 | No |
| Clutter | 38.15 | −9 | 5.62 | 8.80E − 01 | No |

Figure 4D:
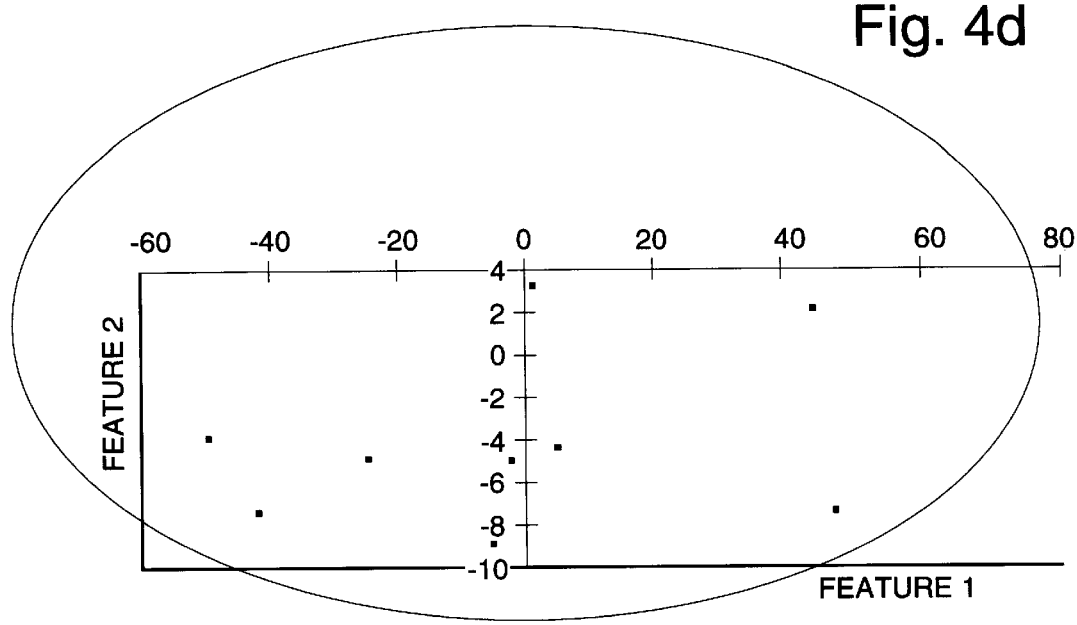

FIG. 4d shows the case where the covariance of the target model is large so that multiple tracks are within the target gate. Here there is sufficient separation in the feature vector between the target and the interference tracks. The target track is acquired even though it is not the closest track to the target model. The deduction of the clutter probability density function using the present invention yields a low likelihood ratio for all clutter tracks and inhibits reacquisition to them. Again, the prior art method would have reacquired to the clutter track.

TABLE 4

(Data for FIG. 4d)

| True Class | Feature 1 | Feature 2 | Distance from Target | Likelihood ratio | Acquired |
|---|---|---|---|---|---|
| Target | 46.04 | 2.2 | 2.66 | 2.00E + 04 | Yes |
| Clutter | −8.86 | −8.89 | 5.03 | 2.00E + 01 | No |
| Clutter | −42.34 | −6.99 | 5.05 | 3.30E − 01 | No |
| Clutter | 48.9 | −8.03 | 6.69 | 3.90E − 01 | No |
| Clutter | 62.6 | −8.21 | 8.56 | 2.20E − 01 | No |
| Clutter | 5.42 | 4.73 | 1.43 | 9.70E − 01 | No |
| Clutter | −48.83 | 4.08 | 3.69 | 4.90E − 01 | No |
| Clutter | −4.43 | −5.2 | 1.71 | 8.00E − 01 | No |
| Clutter | −24.79 | 4.69 | 2.06 | 7.50E − 01 | No |

Figure 4E:
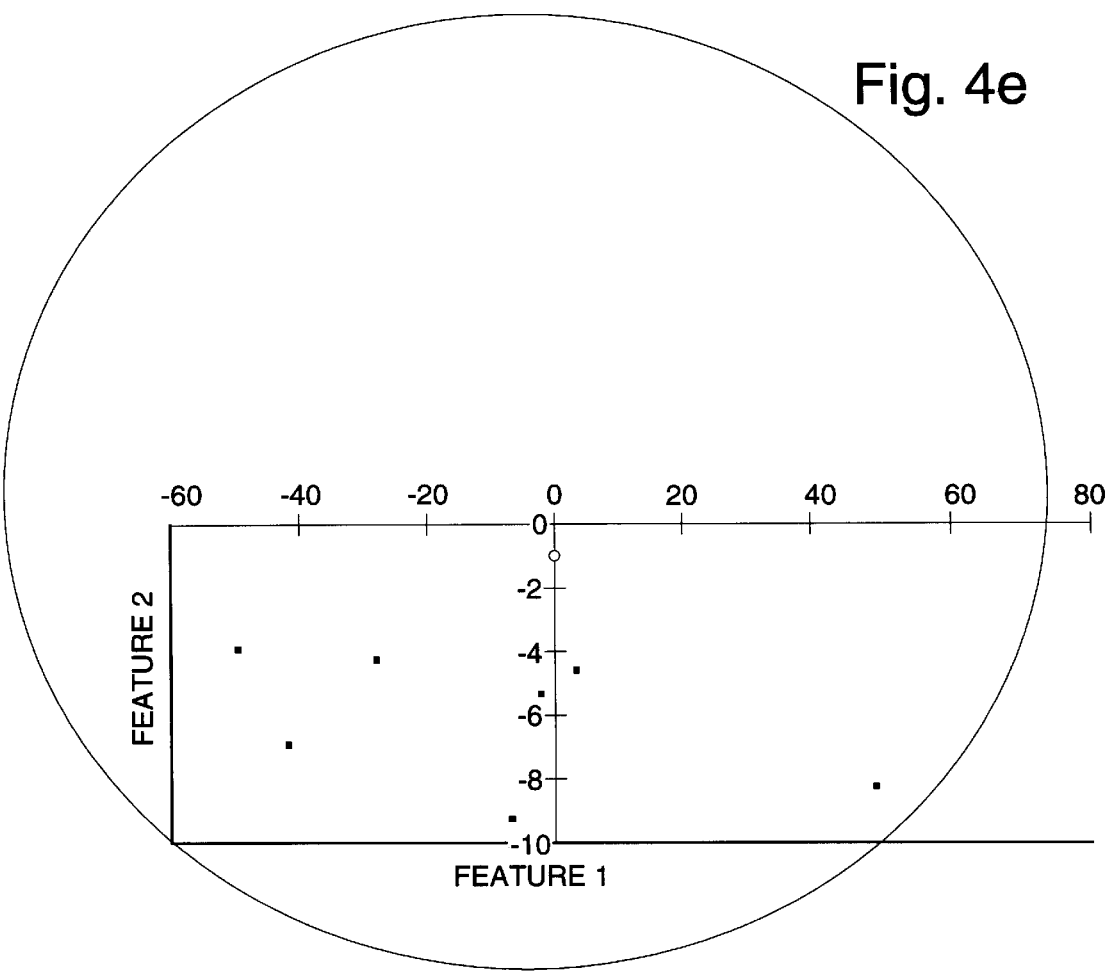

FIG. 4e shows the same situation as FIG. 4d except that the target is not detected (due, for example, to occlusion by flare countermeasures). In this case, no track was reacquired. Again a false reacquisition would have resulted using the prior art method.

TABLE 5

(Data for FIG. 4e)

| True Class | Feature 1 | Feature 2 | Distance from Target | Likelihood ratio | Acquired |
|---|---|---|---|---|---|
| Clutter | −8.86 | −8.89 | 5.03 | 2.00E + 01 | No |
| Clutter | −42.34 | −6.99 | 5.05 | 3.30E − 01 | No |
| Clutter | 48.9 | −8.03 | 6.69 | 3.90E − 01 | No |
| Clutter | 62.6 | −8.21 | 8.56 | 2.20E − 01 | No |
| Clutter | 5.42 | 4.73 | 1.43 | 9.70E − 01 | No |
| Clutter | −48.83 | 4.08 | 3.69 | 4.90E − 01 | No |
| Clutter | −4.43 | −5.2 | 1.71 | 8.00E − 01 | No |
| Clutter | −24.79 | 4.69 | 2.06 | 7.50E − 01 | No |

Thus, a clutter rejection processor and processing method implemented using adaptive estimation of a clutter probability function have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A signal processor for identifying a target contained in an image in the presence of interference, said signal processor comprising:

a target model for processing target feature estimates;

a detection processor for processing input image data comprising the image and for generating regions of interest and features contained in the image;

a temporal processor for processing the regions of interest and features contained in the image output by the detection processor, and for generating tracks and features contained in the image; and a target processor coupled to the target model and the temporal processor for processing the tracks and features contained in the image and the target feature estimates to adaptively estimate the feature probability density function of the interference from the image data, and for processing the estimated probability density function of the interference and the target feature estimates using a Bayesian classifier to generate a signal indicative of the target contained in the image in the presence of interference.

2. The signal processor of claim 1 wherein the input image is provided by an imager.

3. The signal processor of claim 1 wherein the target processor comprises means for:

computing the probability density function of the target using the expected target feature vector and the covariance;

for each track, computing the aposteriori probability that the track belongs to the target class;

computing a normalized square distance between all track pairs of confirmed tracks derived from the temporal processor;

estimating the feature vector and the feature covariance of a nontarget class using the sampled mean and variance of the feature vectors of the members of the nontarget class;

estimating a feature probability density function of the nontarget class using the class feature and covariance;

for each confirmed track, computing the aposteriori probability that the track belongs to of the nontarget class;

computing a likelihood ratio for each confirmed track;

finding all candidate tracks whose feature vectors are greater than a first predetermined threshold and whose likelihood ratio are greater than a second threshold;

selecting the track with the highest likelihood ratio which is the best target track of the image; and acquiring a track that is persistently the best track over several consecutive images as the target.

4. The signal processor of claim 3 wherein tracks are clustered on the basis of normalized square distance using a hierarchical agglomeration process.

5. The signal processor of claim 3 wherein the nontarget class comprises each cluster having three or more members.

6. The signal processor 1 of claim 3 wherein the feature probability density function of the nontarget class is estimated using the class feature and covariance assuming a multivariate normal distribution.

7. A method of identifying a target contained in an image in the presence of interference, said method comprising the steps of:

processing input image data comprising the image to generate regions of interest and features of each region contained in the image;

processing the regions of interest and features of each region contained in the image to generate tracks and features of each region contained in the image;

processing the tracks and features of each region contained in the image and the target feature estimates to adaptively estimate 36 the feature probability density function of the interference from the image data; and processing the estimated probability density function of the interference and the target feature estimates using a Bayesian classifier to generate a signal indicative of the target contained in the image in the presence of interference.

8. The method claim 7 wherein the step of adaptively estimating the feature probability density function of the interference comprises the steps of:

computing the probability density function of the target using the expected target feature vector and the covariance;

for each track, computing the probability that the track belongs to the target class;

computing normalized square distance between all track pairs of confirmed tracks derived from the temporal processor;

estimating 3 the feature vector and the feature covariance of a nontarget class using the sampled mean and variance of the feature vectors of the members of the nontarget class;

estimating a feature probability density function of the nontarget class using the class feature and covariance;

for each confirmed track, computing unnormalized probability that the track belongs to the nontarget class; and computing a likelihood ratio for each confirmed track.

9. The method claim 7 wherein the step of processing the estimated interference probability density function and the target feature estimates using a Bayesian classifier comprises the steps of:

finding all candidate tracks whose feature vectors are greater than a first predetermined threshold and whose likelihood ratio are greater than a second threshold;

selecting the track with the highest likelihood ratio which is the best target track of the image; and acquiring a track that is persistently the best track over several consecutive images as the target.

10. The method claim 8 further comprising the steps of:

finding all candidate tracks whose feature vectors are greater than a first predetermined threshold and whose likelihood ratio are greater than a second threshold;

selecting the track with the highest likelihood ratio which is the best target track of the image; and acquiring a track that is persistently the best track over several consecutive images as the target.

* * * * *